United States Patent
Callender

(10) Patent No.: US 8,320,276 B1
(45) Date of Patent: Nov. 27, 2012

(54) MULTICARRIER COMMUNICATION SUPPORT

(75) Inventor: Christopher Peter Callender, Dollar (GB)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/278,442

(22) Filed: Oct. 21, 2011

Related U.S. Application Data

(63) Continuation of application No. 13/161,640, filed on Jun. 16, 2011.

(30) Foreign Application Priority Data

Jun. 16, 2011 (GB) .................................. 1110209.2

(51) Int. Cl.
*H04L 12/26* (2006.01)
(52) U.S. Cl. ........ 370/252; 370/236; 370/329; 455/437; 455/451; 375/260; 375/299
(58) Field of Classification Search .................. 370/390, 370/401; 455/451, 452.1
See application file for complete search history.

(56) References Cited

U.S. PATENT DOCUMENTS

| | | | |
|---|---|---|---|
| 7,082,310 B2 * | 7/2006 | Hirayama et al. ............. | 455/451 |
| 8,050,343 B2 * | 11/2011 | Nordstrom et al. ............ | 375/260 |
| 8,059,752 B2 * | 11/2011 | Blankenship et al. ......... | 375/299 |
| 2005/0008084 A1 * | 1/2005 | Zhidkov ......................... | 375/260 |
| 2006/0221894 A1 | 10/2006 | Casaccia et al. ............... | 370/328 |
| 2008/0214230 A1 * | 9/2008 | Shinozaki ...................... | 455/522 |
| 2008/0225744 A1 | 9/2008 | DiGirolamo et al. .......... | 370/252 |
| 2009/0275335 A1 * | 11/2009 | Jalloul et al. .................. | 455/437 |

FOREIGN PATENT DOCUMENTS

| WO | WO 2010/045752 A1 | 4/2010 |
|---|---|---|
| WO | WO 2010/051209 A1 | 5/2010 |

* cited by examiner

*Primary Examiner* — Robert Wilson
*Assistant Examiner* — Mohamed Kamara
(74) *Attorney, Agent, or Firm* — Harrington & Smith

(57) ABSTRACT

Embodiments of the invention are concerned with multicarrier communication support, such as non-adjacent multicarrier support for a contiguous-bandwidth receiver. One embodiment includes receiving one or more carriers in a configurable contiguous bandwidth, calculating an imbalance metric representing a receiving imbalance over a set of carriers, said imbalance metric representing a difference between a first value based on received signal strength indication on each of one or more carriers and a second value based on received signal strength indication on each of one or more carriers, verifying, based on the calculated imbalance metric, whether a threshold condition relating to a current mode of an adjacent carrier mode and non-adjacent carrier mode is satisfied, and reporting an event for triggering reconfiguration of said configurable contiguous bandwidth to switch the current mode between said adjacent and non-adjacent carrier modes, if the threshold condition is satisfied.

20 Claims, 8 Drawing Sheets

MULTICARRIER COMMUNICATION SUPPORT

CROSS REFERENCE TO RELATED APPLICATION

This application is a continuation application under 35 USC §120 and 37 CFR 1.53(b) of co-pending U.S. patent application Ser. No. 13/161,640 (filed Jun. 16, 2011), and also claims benefit under 35 U.S.C. §119(a) and 37 CFR 1.55 to UK Patent Application GB 1110209.2, filed on Jun. 16, 2011.

FIELD OF THE INVENTION

The present invention relates to multicarrier support. More specifically, the present invention relates to methods, apparatuses and computer program products for multicarrier support.

BACKGROUND OF THE INVENTION

In the field of wireless communication systems, multicarrier communication has recently attained increasing interest and consideration.

In the context of a 3GPP system environment, various HSDPA techniques are developed for supporting multicarrier operations.

In HSDPA using a single carrier (typically having 5 MHz bandwidth), a receiver with 5 MHz bandwidth is typically used to receive the single HSDPA carrier.

In 3GPP release 8, DC-HSDPA is specified, wherein a terminal is able to receive and to be scheduled on two adjacent 5 MHz HSDPA carriers. The typical RF architecture to receive this type of signal has 10 MHz bandwidth, and also typically direct conversion receivers with a single mixing stage, i.e. contiguous-bandwidth low-complexity receivers, are used for mobile devices. When such receivers are employed for DC-HSDPA, 10 MHz bandwidth is used for covering the two adjacent 5 MHz HSDPA carriers, with the local oscillator tuned between the two carriers of interest.

In 3GPP release 9, multicarrier HSDPA is extended such that the two adjacent HSDPA carriers can reside on different bands, which is referred to as DB-DC-HSDPA.

In 3GPP release 10, the approach is further extended to a total of four HSDPA carriers, which is referred to as 4C-HS-DPA, while in 3GPP release 11, 8C-HSDPA with a total of eight HSDPA carriers, is considered. In both 4C-HDSPA and 8C-HSDPA, the carriers are arranged such that those carriers residing on the same band need to be adjacent. Accordingly, in these techniques, a mixture of adjacent carriers from the same band, and carriers from different bands can be received (e.g., in the case of 4C-HSDPA, 2+2 meaning 2 adjacent carriers from 2 different bands, respectively).

In the context of a LTE system environment, various carrier aggregation (CA) techniques are developed for supporting multicarrier operations. Specifically, contiguous intraband carrier aggregation (CA) for both downlink and uplink is considered in this regard.

Accordingly, any one of the above-mentioned conventional techniques for multicarrier communication, including HSDPA and contiguous intraband CA, require that the multiple carriers to be received on the same band are adjacent to each other. Thereby, a contiguous spectrum range is provided, which is easy to properly receive for the typically deployed contiguous-bandwidth low-complexity (direct conversion) receivers with an appropriate bandwidth to receive the contiguous spectrum range.

However, the conventional assumption of adjacent carriers to be received on the same band is obsolete in certain modern and future wireless communication systems. This is essentially due to non-adjacent spectrum allocations to different operators, e.g. in Europe and the US. As a result, there is an increasingly strong interest in performing multicarrier communication, including HSDPA and (E-UTRA) CA, with non-adjacent carriers, i.e. in a non-contiguous spectrum range, in the same band.

Receiving such non-adjacent carriers, i.e. non-contiguous spectrum range, in the same band is specifically problematic with the typically deployed contiguous-bandwidth low-complexity (direct conversion) receivers. Yet, the use of such receivers is desirable in terms of complexity and cost considerations which are specifically relevant for mobile devices.

Thus, there is a need to further improve such multicarrier systems, i.e. multicarrier communication support, especially in terms of non-adjacent multicarrier support for a contiguous-bandwidth receiver.

SUMMARY OF THE INVENTION

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising receiving one or more carriers in a configurable contiguous bandwidth, said bandwidth being configurable to include one or more carriers in an adjacent spectrum range in an adjacent carrier mode or to include two or more carriers in a non-adjacent spectrum range in a non-adjacent carrier mode, calculating an imbalance metric representing a receiving imbalance over a set of carriers, said imbalance metric representing a difference between a first value based on received signal strength indication on each of one or more carriers of said set and a second value based on received signal strength indication on each of one or more carriers of said set, verifying, based on the calculated imbalance metric, whether a threshold condition relating to a current mode of said adjacent and non-adjacent carrier modes is satisfied, and reporting an event for triggering reconfiguration of said configurable contiguous bandwidth to switch the current mode between said adjacent and non-adjacent carrier modes, if the threshold condition is satisfied.

According to an exemplary aspect of the present invention, there is provided an apparatus comprising an interface configured for communication with at least a network entity on a cellular band, wherein said interface is arranged to receive one or more carriers in a configurable contiguous bandwidth, said bandwidth being configurable to include one or more carriers in an adjacent spectrum range in an adjacent carrier mode or to include two or more carriers in a non-adjacent spectrum range in a non-adjacent carrier mode, and a processing system arranged to calculate an imbalance metric representing a receiving imbalance over a set of carriers, said imbalance metric representing a difference between a first value based on received signal strength indication on each of one or more carriers of said set and a second value based on received signal strength indication on each of one or more carriers of said set, verify, based on the calculated imbalance metric, whether a threshold condition relating to a current mode of said adjacent and non-adjacent carrier modes is satisfied, and report, via said interface, an event for triggering reconfiguration of said configurable contiguous bandwidth to switch the current mode between said adjacent and non-adjacent carrier modes, if the threshold condition is satisfied.

According to further developments or modifications of any one of the aforementioned aspects, in case of the current mode being said non-adjacent carrier mode, said verifying may comprise comparing the calculated imbalance metric with a first threshold, and said reporting may comprise reporting an imbalance event, if the calculated imbalance metric is above said first threshold, and, in case of the current mode being said adjacent carrier mode, said verifying may comprise comparing the calculated imbalance metric with a second threshold, and said reporting may comprise reporting a non-imbalance event, if the calculated imbalance metric is below said second threshold, wherein said first threshold is above said second threshold.

According to further developments or modifications of any one of the aforementioned aspects, in case of the current mode being said non-adjacent carrier mode, said reporting may comprise reporting said event including a carrier characteristic measure on each of said one or more carriers of said set. Also, said carrier characteristic measure may include at least one of a received signal strength indication, received signal code power, a ratio of energy per chip and total input power, reference signal received power, and reference signal received quality.

According to an exemplary aspect of the present invention, there is provided receiving, from a terminal, an event for triggering reconfiguration of a configurable contiguous receiving bandwidth of said terminal, determining, based on the received event, reconfiguration of said configurable contiguous receiving bandwidth of said terminal such that a current mode of said terminal is switched between an adjacent carrier mode in which said bandwidth includes one or more carriers in an adjacent spectrum range and a non-adjacent carrier mode in which said bandwidth includes two or more carriers in a non-adjacent spectrum range, and sending, to said terminal, an instruction to switch the current mode of said terminal between said adjacent and non-adjacent carrier modes based on the determined bandwidth reconfiguration.

According to an exemplary aspect of the present invention, there is provided an apparatus comprising an interface configured for communication with at least a terminal on a cellular band, and a processing system arranged to receive, from said terminal via said terminal, an event for triggering reconfiguration of a configurable contiguous receiving bandwidth of said terminal, determine, based on the received event, reconfiguration of said configurable contiguous receiving bandwidth of said terminal such that a current mode of said terminal is switched between an adjacent carrier mode in which said bandwidth includes one or more carriers in an adjacent spectrum range and a non-adjacent carrier mode in which said bandwidth includes two or more carriers in a non-adjacent spectrum range, and send, to said terminal via said interface, an instruction to switch the current mode of said terminal between said adjacent and non-adjacent carrier modes based on the determined bandwidth reconfiguration According to further developments or modifications of any one of the aforementioned aspects, in case of the received event being an imbalance event, said determining may comprise determining reconfiguration of said configurable contiguous receiving bandwidth of said terminal such that the current mode of said terminal is switched from said non-adjacent carrier mode to said adjacent carrier mode, and, in case of the received event being a non-imbalance event, said determination may comprise determining reconfiguration of said configurable contiguous receiving bandwidth of said terminal such that the current mode of said terminal is switched from said adjacent carrier mode to said non-adjacent carrier mode.

According to further developments or modifications of any one of the aforementioned aspects, in case of the received event being an imbalance event, said receiving may comprise receiving said event including a carrier characteristic measure on each of said one or more carriers, and said determining may comprise determining reconfiguration of said configurable contiguous receiving bandwidth of said terminal based on the received carrier characteristic measure. Also, said carrier characteristic measure may include at least one of a received signal strength indication, received signal code power, a ratio of energy per chip and total input power, reference signal received power, and reference signal received quality.

According to an exemplary aspect of the present invention, there is provided a computer program product comprising computer-executable components which, when the program is run on a computer (such as one of/in any one of the aforementioned apparatus-related aspects), are arranged to execute the method according to any one of the aforementioned method-related aspects.

By way of exemplary embodiments of the present invention, there is provided multicarrier communication support. More specifically, by way of exemplary embodiments of the present invention, there are provided systems, methods and mechanisms for multicarrier communication support.

Thus, improvement is achieved by methods, devices and computer program products enabling multicarrier communication support.

For example, exemplary embodiments of the present invention and improvements thereof specifically relate to non-adjacent multicarrier support for a contiguous-bandwidth receiver.

BRIEF DESCRIPTION OF THE DRAWINGS

For a more complete understanding of exemplary embodiments of the present invention, reference is now made to the following description taken in connection with the accompanying drawings in which.

DESCRIPTION OF EXEMPLARY EMBODIMENTS

Exemplary aspects of the present invention will be described herein below. More specifically, exemplary aspects of the present invention are described hereinafter with reference to particular non-limiting exemplary embodiments of the present invention. A person skilled in the art will appreciate that the invention is not limited to these examples, and may be more broadly applied.

It is to be noted that the following exemplary description mainly refers to specifications being used as non-limiting examples for certain exemplary network configurations and deployments. In particular, 3GPP/WCDMA-related multicarrier techniques such as HSDPA and LTE-(including LTE-Advanced-) related multicarrier techniques such as CA are used as non-limiting examples for the applicability of thus described exemplary aspects and embodiments. As such, the description of exemplary aspects and embodiments given herein specifically refers to terminology which is directly related thereto. Such terminology is only used in the context of the presented non-limiting examples, and does naturally not limit the invention in any way. Rather, any other communication systems, bands, network configurations or system deployments, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms and means for multicarrier communication support, such as for non-adjacent multicarrier support for a contiguous-bandwidth receiver.

Generally, it is to be noted that the term "non-/adjacent" as used herein with respect to a mutual relationship or property of a set of relevant carriers is to be construed to be equivalent to the term "non-/contiguous" or the like. Stated in other words, when referring herein to "non-adjacent multicarrier support", "non-/adjacent carriers" or the like, referring to "non-contiguous multicarrier support", "non-/contiguous carriers" or the like would be the same or equivalent from a technical point of view.

For a better understanding of the present invention and its exemplary embodiments, the following considerations are given.

Figure 1:
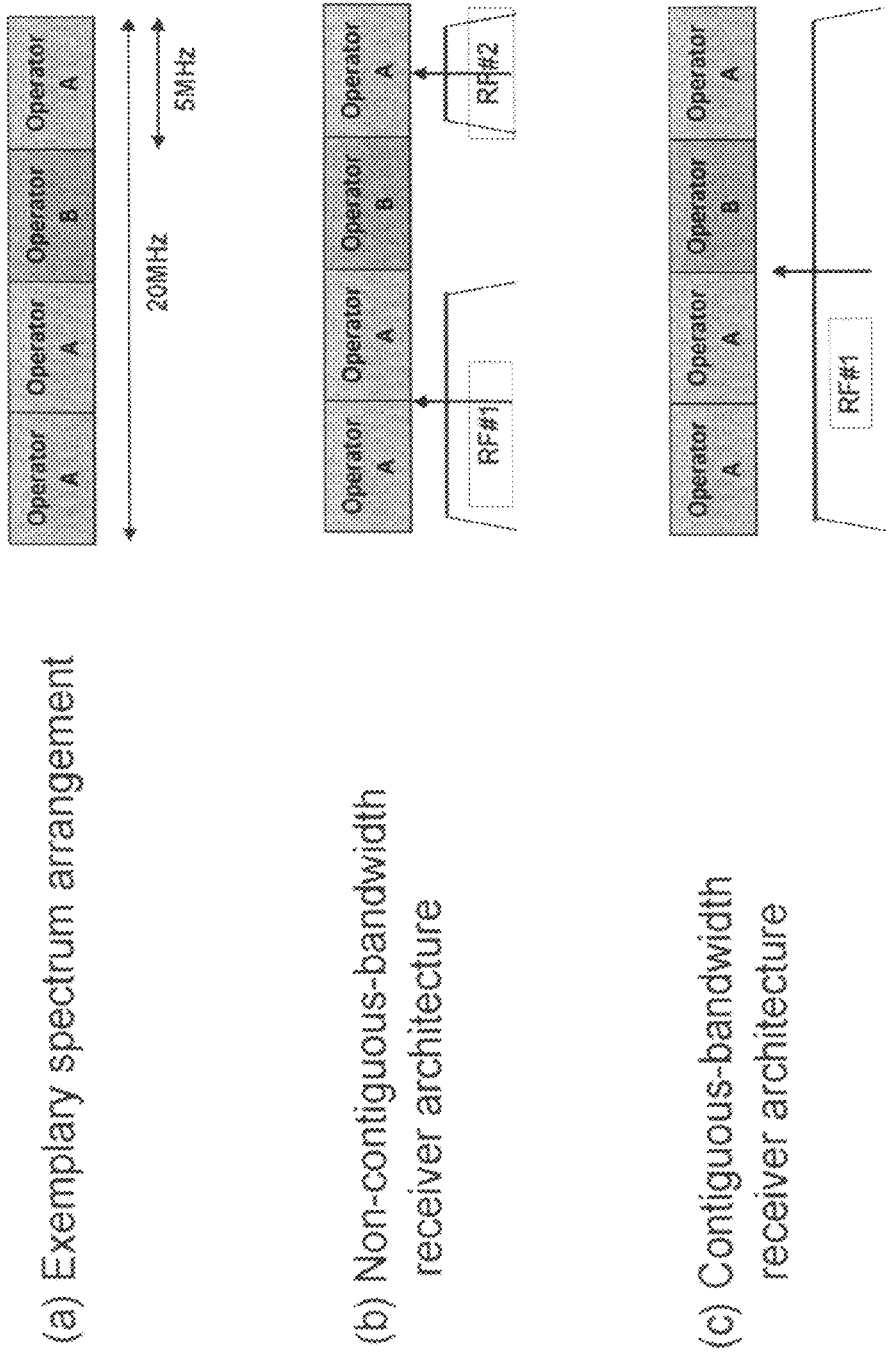
FIG. 1 shows a schematic diagram of an exemplary spectrum arrangement and exemplary receiver architectures in the context of non-adjacent multicarrier communication.

FIG. 1 shows a schematic diagram of an exemplary spectrum arrangement and exemplary receiver architectures in the context of non-adjacent multicarrier communication.

Figure 2:
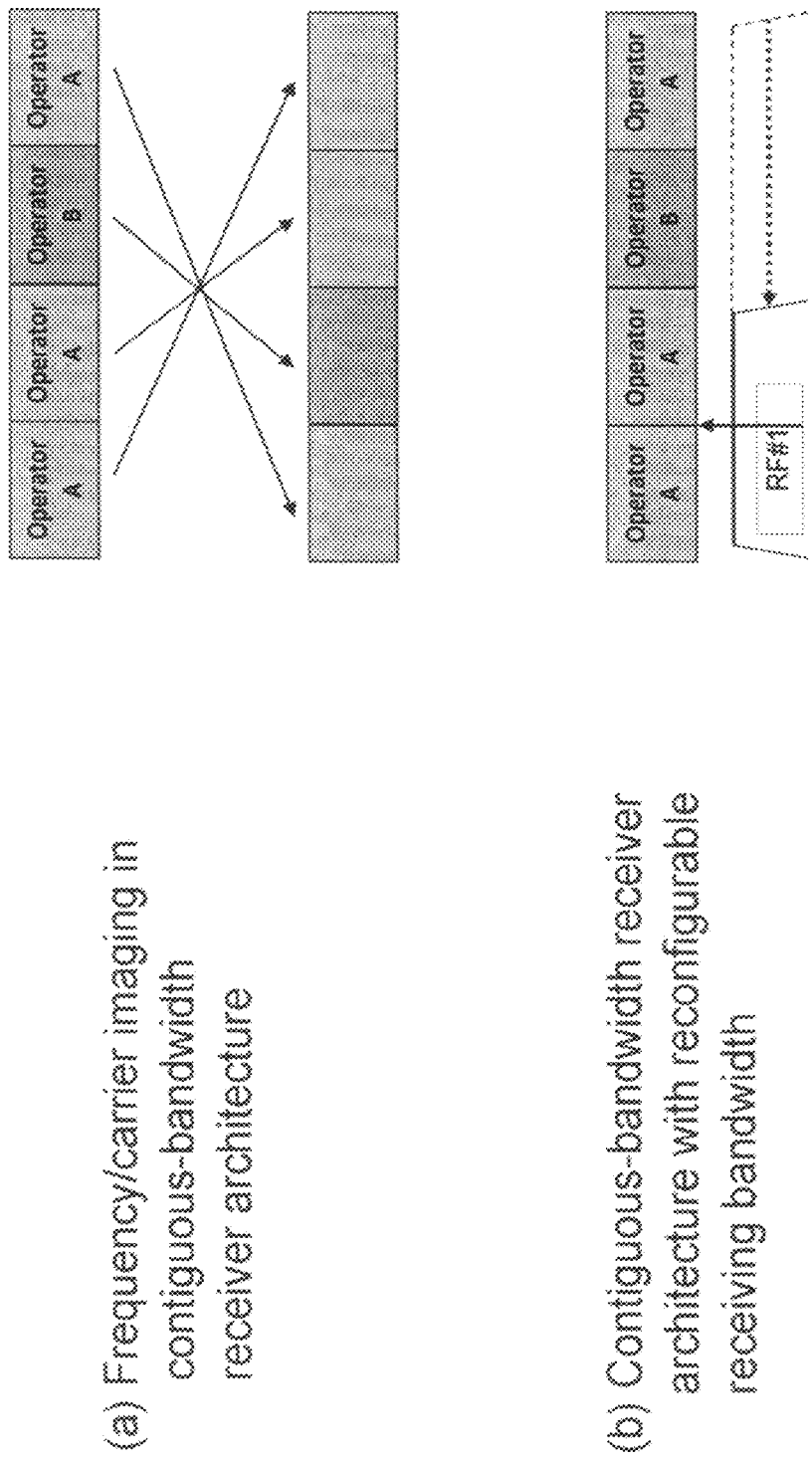
FIG. 2 shows a schematic diagram of frequency imaging in a contiguous-bandwidth receiver architecture and exemplary receiver architecture of a reconfigurable contiguous-bandwidth receiver architecture according to exemplary embodiments of the present invention.

FIG. 2 shows a schematic diagram of frequency imaging in a contiguous-bandwidth receiver architecture and an exemplary receiver architecture of a reconfigurable contiguous-bandwidth receiver architecture according to exemplary embodiments of the present invention.

In the exemplary deployment shown in section (a) of FIG. 1, two operators A and B are allocated spectrum for offering communication services such that the first, second and fourth spectrum ranges are allocated to operator A, and the third spectrum range is allocated to operator B. Operator A is assumed to offer HSDPA service with three carriers from the same band, and operator B is assumed to offer HSDPA service with one carrier from the same band, wherein operator B has a spectrum allocation between operator A's carriers. As a result, operator A, which is the operator assumed to be desired to be received, does not have 15 MHz of adjacent spectrum.

In order for a terminal or receiver to receive signals transmitted by the carriers of operator A, the receiver can be configured according to the arrangements shown in sections (b) and (c) of FIG. 1.

As shown in section (b) of FIG. 1, two (or more) different RF architectures, e.g. two (or more) distinct contiguous-bandwidth receivers or a multi-bandwidth receiver, could be considered for receiving this signal. Namely, two separate RF receivers (for this example, one with 10 MHz bandwidth, and one with 5 MHz bandwidth) could be tuned to the center frequencies indicated by the thick vertical arrows. Alternatively, as shown in section (c) of FIG. 1, a single RF architecture, e.g. a contiguous-bandwidth receiver, with 20 MHz bandwidth with the tuned center frequency being indicated by the thick vertical arrow could be considered for receiving this signal.

The receiver architecture according to section (b) of FIG. 1 is more complex and more expensive, while being more efficient for the relevant non-adjacent multicarrier communication scenario as well as being useful for other implementations such as e.g. dual SIM operations.

The receiver architecture according to section (c) of FIG. 1 is less complex and less expensive, and may thus be preferable especially for mobile devices. Therefore, the single RF architecture, i.e. the contiguous-bandwidth receiver architecture, is adopted as a basis for the further description as well as the present invention and its exemplary embodiments.

The single RF architecture, i.e. the contiguous-bandwidth receiver architecture, according to section (c) of FIG. 1 is based on a single receiver with 20 MHz bandwidth, which could well also be used for adjacent carriers in a contiguous spectrum range, e.g. adjacent-carrier HSDPA and contiguous intraband CA. In this architecture, the spectrum of operator B (in addition to the dedicated spectrum of operator A) is down-converted to a baseband/near-baseband signal, but this part of the signal would not be further processed in the modem, since the terminal would not be configured to receive the spectrum of operator B.

Such contiguous-bandwidth receiver architecture may have a number of limitations compared with a non-contiguous-bandwidth (dual-bandwidth) receiver architecture (shown in FIG. 1 (b)), especially when considering the case where a different operator's spectrum is included within the receiving bandwidth.

For example, problems relating to dynamic range of the received signal may arise. Namely, if the received signal from operator B is significantly stronger than the signal from operator A, then the receiver gain needs to be set so that the overall signal is not clipped. To receive the signal transmitted by the carriers of operator A, additional dynamic range in the analog-to-digital converters in the RF baseband interface and the RF components themselves is needed. Otherwise, the carriers of operator A may be below the receiver noise floor when the gain is set by the need to avoid clipping of the operator B carrier.

Further, problems relating to interference or crosstalk, i.e. signal quality, may arise. Namely, if a direct conversion receiver, as typically adopted as a UE receiver implementation due to cost considerations, is used, then due to non-perfect IQ demodulation (e.g. amplitude imbalance, non-ideal 90 degree phase shift) an RF image of the signal of operator B will inevitably be present in the wanted signal of operator A. This is shown in section (a) of FIG. 2.

As shown in section (a) of FIG. 2, for example, signals of the third carrier or spectrum range are imaged/mapped to the second carrier or spectrum range. Accordingly, the actually wanted signal of operator A in the second signal or spectrum range, to which the receiver is tuned, is superposed by the unwanted signal of operator B. That is, the signal transmitted by the second carrier from of operator A is affected by a RF image of the signal on the third carrier of operator B due to the mirroring around the local oscillator frequency. In general, for this single (direct conversion) receiver architecture, some image of the unwanted operator's signal will always fall on same frequencies as the wanted signal.

For example, the image rejection ratio agreed for LTE is 25 dBc, so if operator B's carrier is 25 dB stronger than operator A's carriers, the signal to noise ratio will not be better than 0 dB, while approximately 18 dB SNR is needed to operate at the highest data rates with 64QAM on HSDPA.

It will therefore be appreciated that the single (direct conversion) receiver architecture cannot easily cope with the situation where an unwanted signal is significantly stronger than the wanted signal.

This limitation would not constitute a significant problem as long as the conventionally adopted working assumptions or requirements of specification work hold; namely, that the multicarrier signals are transmitted from the base station or access node (e.g. the same NodeB site) and all carriers have equal power.

However, it is not possible or practicable to rely on such working assumptions or requirements. This is mainly because two different operators, which have separately and independently licensed their own (possibly non-adjacent) spectrum, cannot be expected or assumed to collocate base station sites or arrange transmission power with each other. Accordingly, for example, if a UE using three carrier services from operator A moves close to a base station site of operator B, the throughput will be severely degraded as the image carrier becomes increasingly degraded and a dropped call is also likely to occur once the receiver runs out of dynamic range.

For the reasons given above, the single RF solution might not be viable when the unwanted signal (of operator B) is received with ~6-10 dB greater wideband power than the wanted carriers (of operator A). The exact limit depends on the needed SNR for operator A's services as well as the additional receiver complexity which would be practically possible to implement. To put this in context, the adjacent channel selectivity requirement for single WCDMA is 33 dB (or more). As a result, there will inevitably be deployments in which the unwanted carrier (of operator B) is much stronger (e.g. 33 dB or more) than the wanted carriers (of operator A), which the UE is configured to receive, and the reality is that in these circumstances, receiving signals transmitted by operator A will be well beyond the capabilities of any practical single receiver implementation, whatever the image rejection ratio or dynamic range of the design may be.

To address the above limitations and drawbacks, the receiver can be configured as a contiguous-bandwidth receiver architecture, but having a configurable receiving bandwidth. This is shown in section (b) of FIG. 2, and alternatively referred to herein as a receiver having single RF architecture.

As indicated in section (b) of FIG. 2, the receiving bandwidth of a single (direct conversion) receiver architecture may, on demand, be reconfigured. In the above example, the receiving bandwidth could for example be reconfigured to be limited from 20 MHz to 10 MHz (or 5 MHz), as illustrated by the dashed lines and dotted arrow, so as to exclude the unwanted carrier or spectrum (of operator B). For example, such reconfiguration may be especially effective when the UE moves close to one of operator B's sites, stopping reception of all of the carriers of operator A and going to a two- or one-carrier operation.

Hence, it would be feasible for operator A to use 3 carriers, e.g. for HSDPA, in an opportunistic way in situations when the received signal from operator B will allow it, but to fall back to 2 channel or 1 channel operation when it is not feasible due to the received signal strength from operator B.

Such reconfiguration of the UE receiving bandwidth could be appropriately controlled at/from the network side, e.g. by RRC signaling.

The further description as well as the present invention and its exemplary embodiments, which is based on the single RF architecture, i.e. the contiguous-bandwidth receiver architecture, having a configurable bandwidth, relates to enabling non-adjacent multicarrier support for contiguous-bandwidth receiver in view of the above considerations.

According to exemplary embodiments of the present invention, specific consideration is given on how to facilitate a receiving bandwidth reconfiguration at the terminal/receiver side in an effective and efficient manner, and/or to inform the network side of the need for a receiving bandwidth reconfiguration. To this end, according to exemplary embodiments of the present invention, there are provided mechanisms for triggering, determining and accomplishing reconfiguration between different receiver bandwidths.

Hereinafter, as outlined above, it is assumed that a terminal or UE comprises a single RF architecture, i.e. the contiguous-bandwidth receiver architecture, having a configurable bandwidth, wherein the bandwidth is configurable to include one or more carriers in an adjacent spectrum range in an adjacent carrier mode (such as in section (b) of FIG. 2) or to include two or more carriers in a non-adjacent spectrum range in a non-adjacent carrier mode (such as in section (c) of FIG. 1). That is, the terminal or UE, or its receiver, is operable either in the adjacent carrier mode or the non-adjacent carrier mode. For example, the non-/adjacent carrier mode may be a non-/adjacent HSDPA carrier mode, a non-/adjacent (intraband) CA carrier mode, or the like.

The subsequently described exemplary embodiments of the present invention are equally applicable, for example, to adjacent and non-adjacent-carrier HSDPA, contiguous and non-contiguous intraband CA, or the like.

While the applicability to non-adjacent/contiguous multicarrier operations is explained above, the applicability to adjacent/contiguous multicarrier operations may result from the following considerations. For example, as regards adjacent-carrier HSDPA, in practice, it is not the case that adjacent carriers from one operator are received by the UE with equal average power. In this regard, exemplary embodiments of the present invention may facilitate more novel network and deployment topologies (e.g. repeaters, remote radio heads, etc.) which are already considered for LTE where there are relatively fewer restrictions on operator deployments. For example, as regards contiguous intraband CA, events identified according to exemplary embodiments of the present invention can be used to indicate that the secondary component carrier should be deconfigured (if an imbalance event has occurred) or configured (if a non-imbalance event has occurred).

Figure 3:
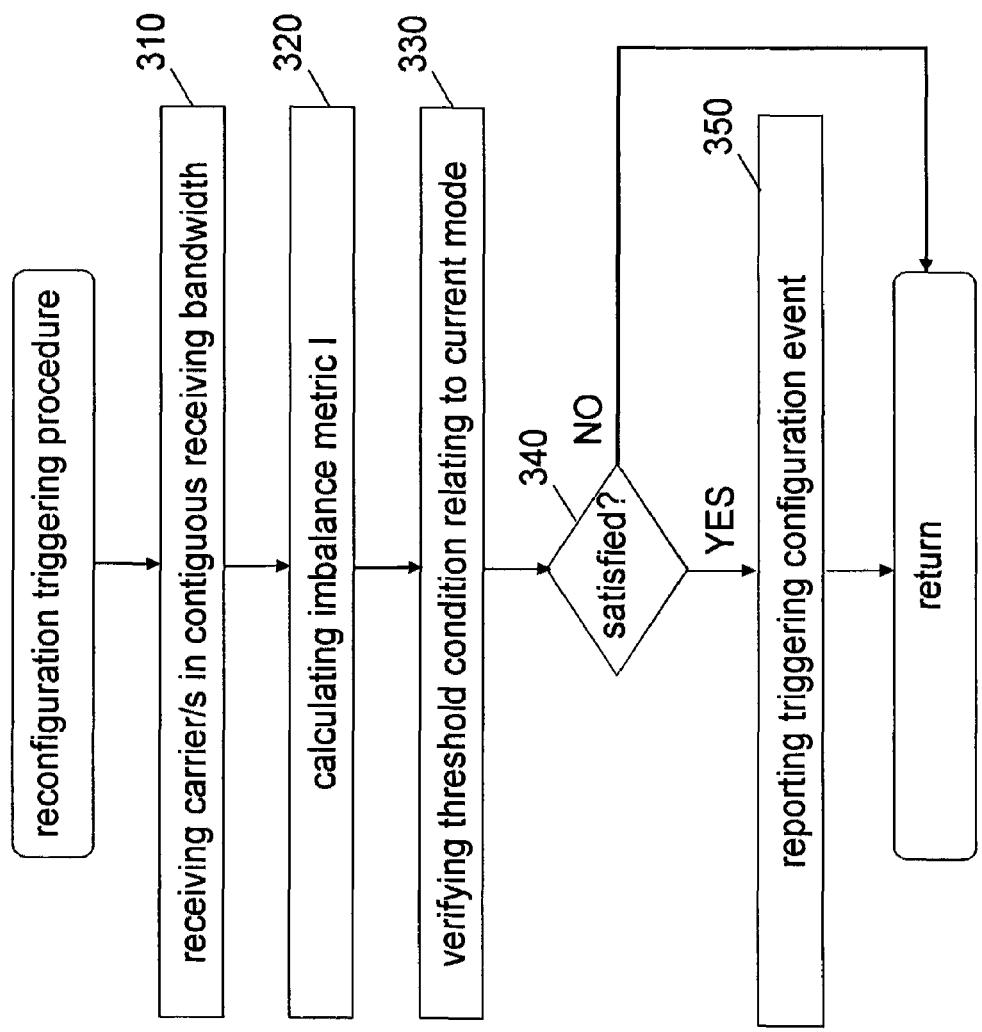
FIG. 3 shows a flowchart illustrating an example of a reconfiguration triggering procedure which is operable at or by a terminal according to exemplary embodiments of the present invention.

FIG. 3 shows a flowchart illustrating an example of a reconfiguration triggering procedure which is operable at or by a terminal according to exemplary embodiments of the present invention. At step 310, the terminal receives one or more carriers in a configurable contiguous bandwidth, then calculates an imbalance metric I representing a receiving imbalance over a set of carriers (320), and verifies, based on the calculated imbalance metric, whether a threshold condition relating to a current mode of said adjacent and non-adjacent carrier modes is satisfied (330, 340); further, the terminal reports an event for triggering reconfiguration of said configurable contiguous bandwidth so as to switch the current mode between said adjacent and non-adjacent carrier modes (350), if the threshold condition is satisfied.

In this way, according to exemplary embodiments of the present invention, detection of a problem scenario for the receiver, in particular a problem of imbalance in terms of power and/or load on various carriers in a non-adjacent multicarrier scenario, may be facilitated by virtue of one or more specified triggering reconfiguration events (also referred to as measurement events) which is or are issued on the basis of a specified imbalance metric.

The imbalance metric I according to exemplary embodiments of the present invention represents a difference between a first value based on received signal strength indication on each of one or more carriers of the carrier set and a second value based on received signal strength indication on each of one or more carriers of the carrier set. In other words, the imbalance metric according to exemplary embodiments of the present invention represents a relative difference in received signal strength indication (RSSI) over a specific (sub-)set of carriers. Details of the imbalance metric according to exemplary embodiments of the present are set out below.

The imbalance metric I according to exemplary embodiments of the present invention is based on RSSI, i.e. is a RSSI metric. This is particularly beneficial, since the RSSI is the actual metric which is most effective as far as the impact of RF receiver images and receiver dynamic ranges are concerned. Another advantage of using such RSSI metric is that it is not required to indicate a neighbor cell list containing scrambling codes of another operator spectrum or the like in order to measure RSCP or RSRP which represent conceivable alternative metrics. While these may be alternative metrics to RSSI, it is to be noted that using RSCP or RSRP as a metric or using CQI, Ec/Io or RSRQ as a metric has fewer benefits than does using RSSI, since there can be significant differences in load between different operator's spectrum, and operator will not share this information with each other on a real time basis, and/or such parameters could be degraded or impaired by other phenomena, such as reaching a cell edge.

In the following, $RSSI(x_i)$ indicates the measured RSSI on each of the received carriers $x_i$ (i.e. the (sub-)set of carriers $x_i$) in dB.

According to exemplary embodiments of the present invention, the imbalance metric may be such that the aforementioned first value is a maximum value of received signal strength indication on each of the carriers of said set, and the aforementioned second value is a minimum value of received signal strength indication on each of the carriers of said set. This could be expressed as follows:

$$I=\max(RSSI(x_i))-\min(RSSI(x_i)),$$

where the index i covers all carriers of interest.

The imbalance metric may be such that the aforementioned first value is a maximum value of received signal strength indication on each of non-dedicated carriers out of said set, and the aforementioned second value is a minimum value of received signal strength indication on each of dedicated carriers out of said set. Thereby, it is possible to treat dedicated or configured carriers within the receiver bandwidth and non-dedicated or non-configured carriers within the receiver bandwidth differently. For example, dedicated or configured carriers may be those of the operator desired to be received, and non-dedicated or non-configured carriers may be those of other operators. This could be expressed as follows:

$$I=\max(RSSI(x_i))-\min(RSSI(x_j)),$$

where the range of $x_i$ extends to all non-dedicated/configured carriers in the receiver bandwidth, and the range of $x_j$ extends to all dedicated/configured carriers in the receiver bandwidth. This may ensure that imbalance is only triggered if the difference between a non-dedicated/configured carrier and the smallest RSSI out of the set of dedicated/configured carriers becomes bigger than the aforementioned threshold condition.

Alternatively the imbalance metric may be such that the aforementioned first value is a maximum value of received signal strength indication on each of non-dedicated carriers out of said set, and the aforementioned second value is an average value of received signal strength indication on each of dedicated carriers out of said set. Thereby, power averaging could be considered rather than min( ) and max( ) functions. This could be expressed as follows:

$$I=\max(RSSI(x_i))-\text{average}(RSSI(x_j)),$$

where the range of $x_i$ extends to all non-dedicated/configured carriers in the receiver bandwidth, and the range of $x_3$ extends to all dedicated/configured carriers in the receiver bandwidth. The thus defined imbalance metric indicates the power difference between the worst non-dedicated/configured carrier and the mean RSSI for the dedicated/configured carriers. While all configured carriers for multicarrier HSDPA, for example, should have approximately the same power, such that the average($RSSI(x_j)$) term may not be very different from the min($RSSI(x_j)$) term, the thus defined imbalance metric may give a benefit of improved accuracy due to averaging of the configured RSSI across a wider bandwidth for frequency selective fading.

As a further alternative, the imbalance metric may be such that the aforementioned first value is an average value of received signal strength indication on each of non-dedicated carriers out of said set, and the aforementioned second value is a minimum value of received signal strength indication on each of dedicated carriers out of said set. This could be expressed as follows:

$$I=\text{average}(RSSI(x_i))-\text{average}(RSSI(x_j)),$$

where the range of $x_i$ goes over all non-dedicated/configured carriers in the receiver bandwidth, and the range of $x_j$ goes over all dedicated/configured carriers in the receiver bandwidth. The thus defined imbalance metric may be beneficial in providing improved accuracy due to frequency domain averaging.

By using the imbalance metric according to exemplary embodiments of the present invention, it is possible to trigger a new event that allows an operator to detect the imbalance situation or non-imbalance situation as experienced by the UE receiver: for example, the UE can report events to the network via RRC signaling or the like.

Figure 4:
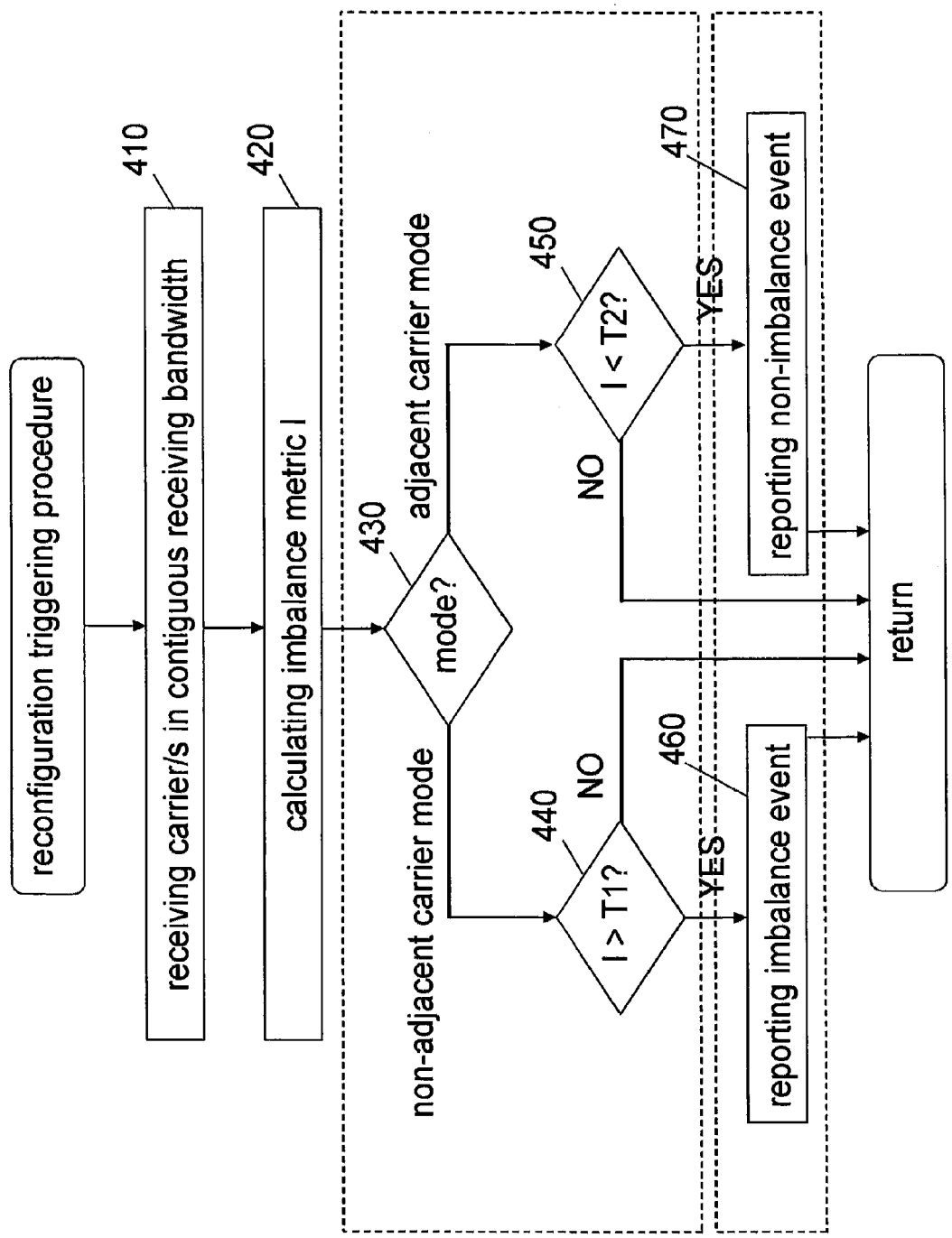
FIG. 4 shows a flowchart illustrating another example of a reconfiguration triggering procedure which is operable at or by a terminal according to exemplary embodiments of the present invention.

FIG. 4 shows a flowchart illustrating another example of a reconfiguration triggering procedure which is operable at or by a terminal according to exemplary embodiments of the present invention.

In the exemplary procedure of FIG. 4, operations 410 and 420 correspond to operations 310 and 320 of FIG. 3, respectively. The upper dashed block corresponds to operations 330 and 340 of FIG. 3, and the lower dashed block corresponds to operation 350 of FIG. 3.

As shown in FIG. 4, a reconfiguration triggering procedure according to exemplary embodiments of the present invention involves distinguishing between modes of operation, i.e. determining whether the terminal or UE in question is currently operating in adjacent carrier mode or non-adjacent carrier mode. A corresponding determination may be made, as illustrated in operation 430 of FIG. 4. While depicted as an explicit operation in FIG. 4, it is to be noted that such determination does not necessarily have to be executed as such, since the current mode of operation could be an inherently available information; further, the determination could be performed either prior to operation 420 or 410 or after a comparison of the calculated imbalance metric I with a first threshold T1 and/or a second threshold T2, as illustrated in operations 440 and 450 of FIG. 4.

When the device, i.e. the terminal or UE, is operating in the non-adjacent carrier mode, the imbalance metric I can be determined in a straightforward manner. Namely, the set of carriers for calculating the imbalance metric I comprises received carriers only.

In this regard, the UE knows with certainty which carriers fall within its RF receiver bandwidth; as a result the set of carriers over which the metric I is evaluated could be left for its implementation to decide. For example a UE that is configured with a non-contiguous-bandwidth (dual-bandwidth) receiver architecture (as shown in section (b) of FIG. 1) would not need to report imbalance, since no other operator carriers fall within the bandwidth of its receivers. However, if the UE has two distinct (contiguous-bandwidth) receivers, then it may be configured to determine imbalance within either one of the two distinct receivers, but not imbalance between the two distinct receivers themselves. That is, a UE having two distinct receivers could apply the reconfiguration triggering procedure according to exemplary embodiments of the present invention for any one of the receivers separately, just like a UE having a single receiver.

When the device, i.e. the terminal or UE, is operating in the adjacent carrier mode with smaller bandwidth (as shown in section (c) of FIG. 2), which could be the result of a preceding detection of an imbalance condition and a corresponding reporting of an imbalance event in non-adjacent carrier mode (see below for details), the terminal or UE needs to monitor whether or not the imbalance condition has cleared; if so, it can send a non-imbalance or balance event so as to return to larger bandwidth. In this regard, when determining the imbalance metric I, two aspects need to be specifically considered.

When the UE is currently operating in adjacent carrier mode with smaller bandwidth, a determination may be made as to whether an imbalance condition will occur when switching to non-adjacent carrier mode with larger bandwidth so as to avoid an unfavorable mode switching. In this regard, the UE needs to be informed of so-called "candidate" non-adjacent carriers, i.e. the candidate carrier to be additionally included in the receiving bandwidth when being reconfigured to switch to the non-adjacent carrier mode. Assuming the UE to be currently configured for adjacent operation (e.g. carriers 1 and 2 in the example case of FIGS. 1 and 2) and the network (such as a responsible network entity) informs the UE, e.g. via RRC signaling, that it would like to configure carrier 4 as well, when power balance conditions permit, this allows the UE then to consider hypothetically what the imbalance would be when its receiver is changed to the "candidate" configuration. Hence, it can evaluate the imbalance metric I over a consistent set of carriers both when it is operating in non-adjacent carrier mode, and when it is operating in adjacent carrier mode, and trigger the imbalance/non-imbalance events over a consistent set of carriers.

The terminal or UE can also be enabled to monitor carriers other than those corresponding to its current configuration, i.e. candidate carriers, for hypothetically detecting a potential imbalance condition. This can be achieved by configuring the UE to operate in a compressed mode, which enables the UE to retune its receiver when it is operating in the adjacent carrier mode (e.g. carriers 1 and 2 in the example case of FIGS. 1 and 2) to measure RSSI on some further carriers (e.g. carriers 3 and 4 in the example case of FIGS. 1 and 2). In this regard, the UE can use explicit compressed mode gaps; alternatively, and because the non-imbalance event is not time critical, the UE can be configured to autonomously retune and measure RSSI on a different carrier. (The impact of failing to detect "no imbalance" is just that the UE does not work at its highest potential data rate, while the impact of failing to detect "imbalance" may be worse, e.g. a dropped call.) Hence, the UE may autonomously evaluate the non-imbalance event fairly infrequently (e.g. once per minute) and explicit compressed mode gaps might not be needed. For example, if CPC DRX or DTX occurs, the UE may evaluate the non-imbalance event by measuring the other carriers during a DRX/DTX gap.

When it is in imbalance condition, the same receiver as being used for data reception cannot be used to monitor those carriers due to the imbalance condition itself (unless natural DTX/DRX gaps are to be used). In this situation the UE would need gaps to monitor the other carriers, and for this reason could be considered a UE capability.

As shown in FIG. 4, different thresholds are used for the verification of the current operating mode (step 430). Namely, in case of the current mode being determined to be the non-adjacent carrier mode in operation 430, the calculated imbalance metric I is compared with a first threshold T1 (440), while in case of the current mode being determined to be the adjacent carrier mode in operation 430, the calculated imbalance metric I is compared with a second threshold T2 (450), wherein the first threshold is above the second threshold, i.e. T1>T2 (dB). For example, T1 may be 6 dB and T2 may be 3 dB.

The thresholds which are used to trigger an event, i.e. an imbalance and non-imbalance event, according to exemplary embodiments of the present invention can either be left to network configuration, or autonomously determined by UE implementation. One benefit of leaving it to UE implementation is that the performance e.g. of different implementations may vary between UE (e.g. some have more tolerance to power differences than others, due for example to some design having better IQ balance), which means that one UE could choose to use a higher threshold than another.

As shown in FIG. 4, different events are used for the reporting operation (steps 460, 470). Namely, in case of the current mode being determined to be the non-adjacent carrier mode in operation 430 and the calculated imbalance metric I being determined to be above the first threshold T1 in operation 440, an imbalance event is reported (460), while in case of the current mode being determined to be the adjacent carrier mode in operation 430 and the calculated imbalance metric I is determined to be below the second threshold T2 in operation 450, a non-imbalance (or balance) event is reported (470). The report is issued to the network, i.e. a network entity such as a base station (e.g. NodeB, eNB) or controller (e.g. RNC).

When reporting an imbalance event, according to exemplary embodiments of the present invention, the report may additionally include or be complemented by (i.e. reported along with) a carrier characteristic measure relating to each of the carrier/s of the relevant carrier set (wherein the term "characteristic" may relate to quality, level, state, or the like). This allows the relevant network entity (e.g. the NodeB, eNB or RNC) to better understand which carrier(s) have triggered the imbalance event, and to respond by reconfiguring the UE in an appropriate way to remove the imbalance problem. That is, such carrier characteristic measure could tell the relevant network entity (e.g. the NodeB, eNB or RNC) which carrier was the one that caused the problem.

Such carrier characteristic measure according to exemplary embodiments of the present invention may include at least one of a received signal strength indication (RSSI), received signal code power (RSCP), a ratio of energy per chip and total input power (Ec/Io), reference signal received power (RSRP), and reference signal received quality (RSRQ), whatever is appropriate in view of the operating environment. As the RSSI is measured for each relevant carrier for calculating the imbalance metric, this value may be easily utilized as a characteristic measure on each carrier. Alternatively, for WCDMA measurements RSCP and Echo results could be used, and for E-UTRA measurements RSRP and RSRQ results could be used. The benefit of such approach may be to reuse existing reporting metrics, especially for LTE where RSSI reporting is not defined.

Generally, in the imbalance metric measurements and events according to exemplary embodiments of the present invention, various conventionally known mechanisms could also be applied, such as for example a time to trigger, and a L3 (layer 3) filter.

Figure 5:
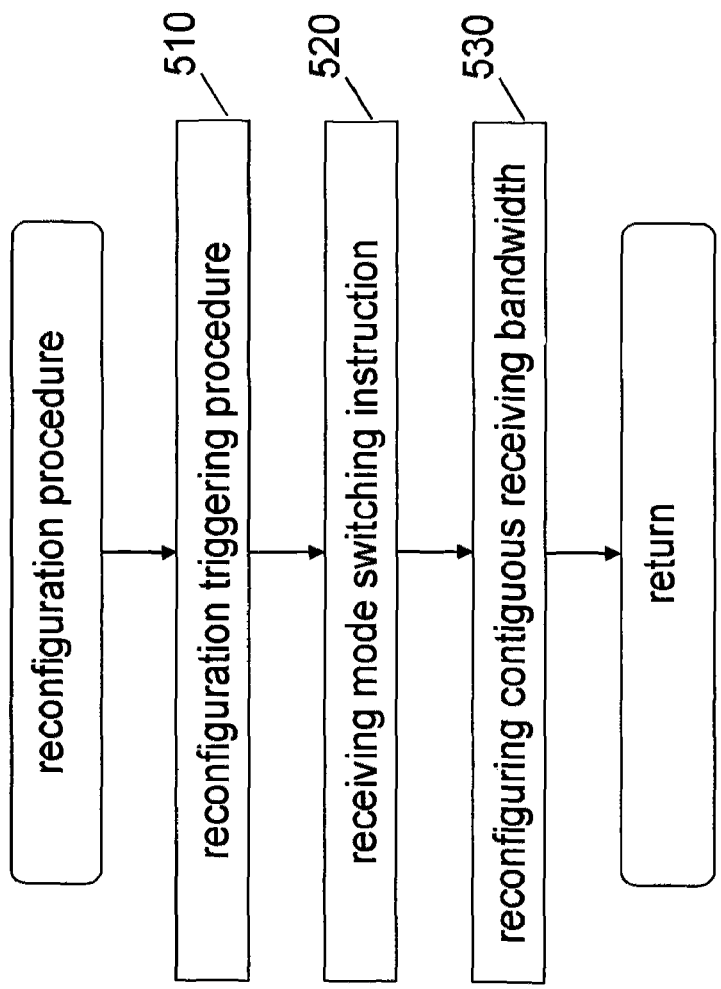
FIG. 5 shows a flowchart illustrating an example of a reconfiguration procedure which is operable at or by a terminal according to exemplary embodiments of the present invention.

FIG. 5 illustrates an example of a reconfiguration process which is operable at or by a terminal according to exemplary embodiments of the present invention. The process may comprise a reconfiguration triggering procedure (510), as described above in connection with FIG. 3 or 4, an operation of receiving (520), from a network entity, an instruction to switch the current mode between said adjacent and non-adjacent carrier modes, and an operation of reconfiguring (530), based on the received instruction, the configurable contiguous receiving bandwidth such that a current mode is switched between the adjacent carrier mode and the non-adjacent carrier mode.

In view thereof, according to exemplary embodiments of the present invention, the operating mode or receiving bandwidth configuration of a terminal or UE may be appropriately reconfigured depending on an imbalance or non-imbalance event and a corresponding instruction from the network side. That is, the terminal or UE may be reconfigured to operate with smaller bandwidth because an imbalance condition has earlier been detected and reported in non-adjacent carrier mode, or the terminal or UE may be reconfigured to operate with larger bandwidth because a non-imbalance condition has earlier been detected and reported in adjacent carrier mode.

According to exemplary embodiments of the present invention, the mode switching instructions may be given to the terminal or UE by way of RRC signaling or the like.

Figure 6:
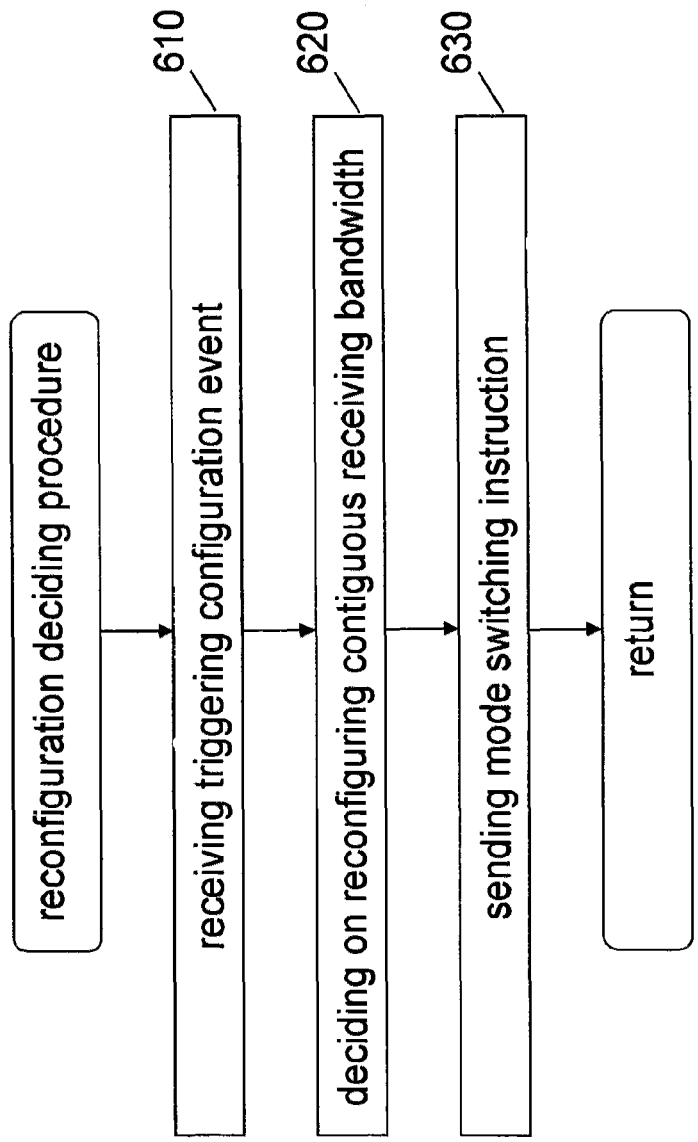
FIG. 6 shows a flowchart illustrating an example of a reconfiguration deciding procedure which is operable at or by a network entity according to exemplary embodiments of the present invention.

FIG. 6 illustrates an example of a reconfiguration determining (deciding) procedure which is operable at or by a network entity according to exemplary embodiments of the present invention. The procedure may comprise an operation of receiving (610), from a terminal, an event for triggering reconfiguration of a configurable contiguous receiving bandwidth of said terminal, an operation of determining (620), based on the received event, on reconfiguring the configurable contiguous receiving bandwidth of said terminal such that a current mode of said terminal is switched between the adjacent carrier mode and the non-adjacent carrier mode, and an operation of sending (630), to said terminal, an instruction to switch the current mode of said terminal between the adjacent and non-adjacent carrier modes based on the determined bandwidth reconfiguration.

Accordingly, the (access) network side, e.g. a RNC in a UTRA network or eNB in an E-UTRA network, uses the imbalance and non-imbalance events from the terminal or UE to assist in its decision to reconfigure the terminal or UE to the adjacent carrier mode (if an imbalance event is reported) or the non-adjacent carrier mode (if a non-imbalance event is reported).

In view thereof, according to exemplary embodiments of the present invention, an appropriate operating mode or receiving bandwidth configuration of a terminal or UE may be determined at and instructed from the network side, i.e. at a network entity such as a NodeB, eNB or RNC of a specific operator dedicated/configured to be received at the terminal or UE (e.g. operator A in the example case of FIGS. 1 and 2).

According to exemplary embodiments of the present invention, the receiving and sending may be accomplished by way of RRC signaling or the like.

Figure 7:
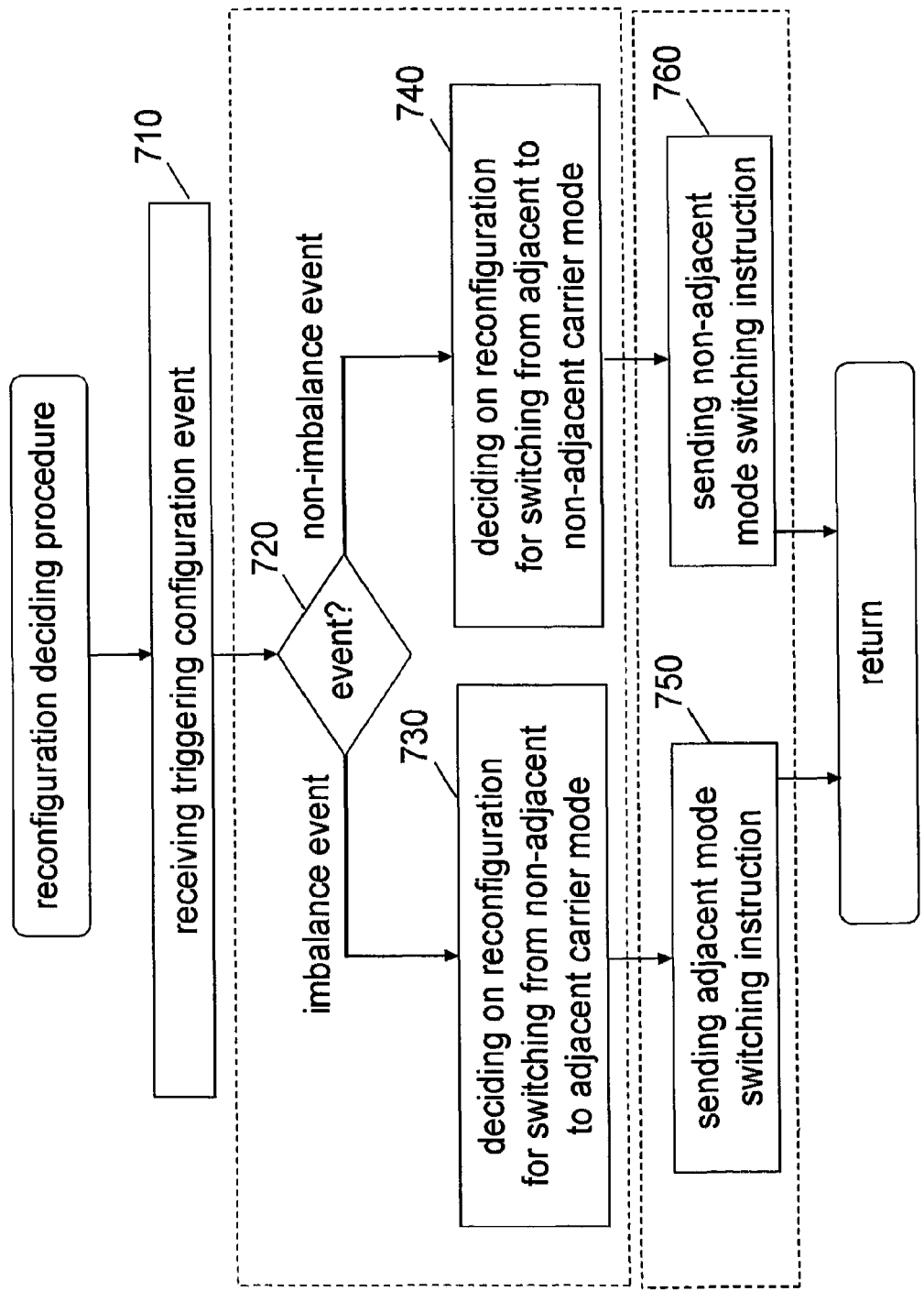
FIG. 7 shows a flowchart illustrating another example of a reconfiguration deciding procedure which is operable at or by a network entity according to exemplary embodiments of the present invention.

FIG. 7 illustrates another example of a reconfiguration determining (deciding) procedure which is operable at or by a network entity according to exemplary embodiments of the present invention.

In the exemplary procedure of FIG. 7, operation 710 corresponds to operation 610 of FIG. 6. The upper dashed block corresponds to operation 620 of FIG. 6, and the lower dashed block corresponds to operation 630 of FIG. 6.

As shown in FIG. 7, the process involves identifying the current mode of operation of a terminal or UE to be controlled, i.e. whether the terminal or UE in question is currently operating in adjacent carrier mode or non-adjacent carrier mode, by means of the type of event received from a terminal or UE to be controlled (i.e. whether an imbalance event or a non-imbalance event is reported by and received from the UE). A corresponding determination may be made, as illustrated in operation 720 of FIG. 7, on the basis of a type of event if indicated in the received signal, a dedicated indication in the received event or signal, or the like.

As shown in FIG. 7, in case of the received event being an imbalance event, the determining operation may involve determining (730) to reconfigure the configurable contiguous receiving bandwidth of the terminal such that the current mode of said terminal is switched from the non-adjacent carrier mode to the adjacent carrier mode, and the sending operation may involve (750) sending a corresponding instruction for such mode switching to the terminal. As shown in FIG. 7, in case of the received event being a non-imbalance event, the determining operation may involve determining (740) to reconfigure the configurable contiguous receiving bandwidth of the terminal such that the current mode of said terminal is switched from the adjacent carrier mode to the non-adjacent carrier mode, and the sending operation may comprise (760) may comprise sending a corresponding instruction for such mode switching to the terminal.

As described above, according to exemplary embodiments of the present invention, an imbalance event may additionally include or be complemented by (i.e. reported along with) a carrier characteristic measure relating to each of the carrier/s of the relevant carrier set (wherein the term "characteristic" may relate to quality, level, state, or the like). If such a characteristic-enhanced event is received, this allows the relevant network entity (e.g. the NodeB, eNB or RNC) to better understand which carrier(s) have triggered the imbalance event, and to respond by reconfiguring the UE in an appropriate way to remove the imbalance problem. That is, such carrier characteristic measure, if received, could tell the relevant network entity (e.g. the NodeB, eNB or RNC) which carrier was the one that caused the problem. As mentioned above, such carrier characteristic measure may include at least one of a received signal strength indication (RSSI), received signal code power (RSCP), a ratio of energy per chip and total input power (Ec/Io), reference signal received power (RSRP), and reference signal received quality (RSRQ), whatever is appropriate in view of the operating environment.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 8, while for the sake of brevity reference is made to the detailed description of respective corresponding methods and operations according to FIGS. 3 to 7 as well as the underlying deployments, architectures and configurations according to FIGS. 1 and 2.

Figure 8:
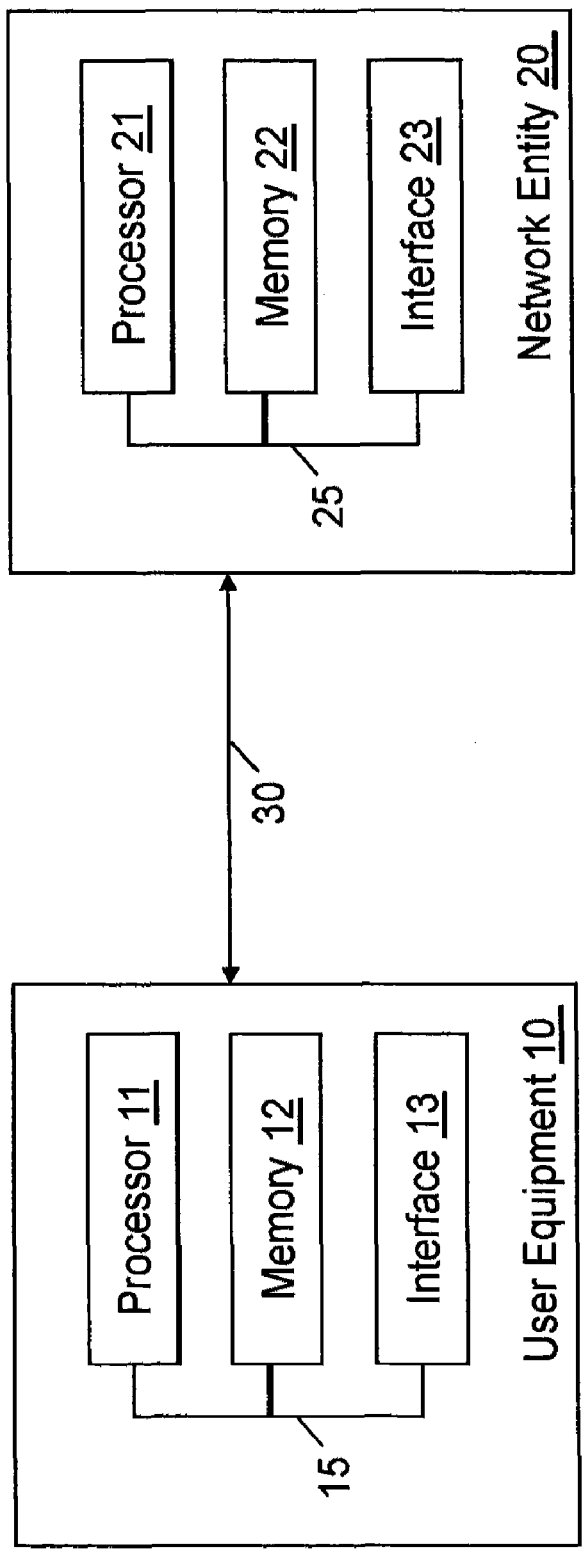
FIG. 8 shows a block diagram illustrating exemplary devices according to exemplary embodiments of the present invention.

FIG. 8 is a simplified block diagram representing an embodiment of the invention, in which the components presented as solid line blocks are configured to perform the operations described above. Such functional blocks are implementation-independent, i.e. may be implemented by means of any kind of hardware or software, respectively. The arrows and lines interconnecting individual blocks illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 8, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein. FIG. 8 shows a block diagram illustrating exemplary devices according to exemplary embodiments of the present invention, yet in a simplified manner.

In view of the above, the thus described devices/apparatuses 10 and 20 are suitable for use in practicing the exemplary embodiments of the present invention, as described herein. The thus described apparatus 10 on the left hand side may represent a (part of a) terminal or user equipment UE, as described above, and may be configured to perform a procedure and/or exhibit a functionality as described in conjunction with any one of FIGS. 3 to 5. The thus described apparatus 20 on the right hand side may represent a (part of a) network entity, i.e. base station or access node or controller, such as for example a NodeB, an eNB, a RNC, or the like, as described above, and may be configured to perform a procedure and/or exhibit a functionality as described in conjunction with any one of FIGS. 6 and 7.

As shown in FIG. 8, according to exemplary embodiments of the present invention, a terminal or user equipment 10 comprises a processor 11, a memory 12, and an interface 13, which are connected by a bus 15 or the like, and a network entity 20 comprises a processor 21, a memory 22, and an interface 23, which are connected by a bus 25 or the like. The terminal or user equipment 10 may be connected with the network entity 20 through a link or connection 30.

The memories 12 and 22 may store respective programs assumed to include program instructions that, when executed by the associated processors 11 and 21, enable the respective electronic device or apparatus to operate in accordance with the exemplary embodiments of the present invention. The processors 11 and 21 and/or the interfaces 13 and 23 may also include a modem or the like to facilitate communication over the (hardwire or wireless) link 30, respectively. The interfaces 13 and 23 may include a suitable transceiver coupled to one or more antennas or communication means for (hardwire or wireless) communications with the linked or connected device(s), respectively. The interfaces 13 and 23 are generally configured to communicate with another apparatus, i.e. the interface thereof.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

According to exemplary embodiments of the present invention, the device 10 may be a terminal comprising a contiguous-bandwidth receiver configured to operate in one of the adjacent carrier mode and the non-adjacent carrier mode, and/or the device 10 may be configured for at least one of contiguous-band multicarrier HSPDA operation and intra-band CA operation in accordance with LTE specifications.

According to exemplary embodiments of the present invention, the interface 13 is generally configured for communication with at least a network entity on a cellular band, and is specifically configured to receive one or more carriers in a configurable contiguous bandwidth, i.e. in the adjacent carrier mode or the non-adjacent carrier mode. The processor 11 is configured to calculate an imbalance metric representing a receiving imbalance over a set of carriers, as described above, to verify, based on the calculated imbalance metric, whether a threshold condition relating to a current mode of said adjacent and non-adjacent carrier modes is satisfied, and to report, via said interface 13, an event for triggering reconfiguration of said configurable contiguous bandwidth to switch the current mode between said adjacent and non-adjacent carrier modes, if the threshold condition is satisfied.

According to exemplary embodiments of the present invention, the processor 11 may be configured to operate as follows depending on the current operating mode of the terminal. In case of the current mode being the non-adjacent carrier mode, the processor may be configured to, for verifying, compare the calculated imbalance metric with a first threshold and, for reporting, report an imbalance event, if the calculated imbalance metric is above said first threshold. In case of the current mode being the adjacent carrier mode, the processor may be configured to, for verifying, compare the calculated imbalance metric with a second threshold and, for reporting, report a non-imbalance event, if the calculated imbalance metric is below said second threshold. Further, in case of the current mode being the non-adjacent carrier mode, the processor may be configured to, for reporting, report said event including the aforementioned carrier characteristic measure on each of said one or more carriers of said set.

According to exemplary embodiments of the present invention, the processor 11 may be configured to calculate the imbalance metric in any one of the above-described ways, as explained in connection with FIG. 3. That is, the processor 11 may be configured to adopt the first and second values accordingly, and to adopt, in case of the current mode being the non-adjacent carrier mode, the relevant carrier set so as to comprise received carriers only, and, in case of the current mode being the adjacent carrier mode, the relevant carrier set so as to comprise received carriers and candidate carriers to be received after a candidate reconfiguration.

According to exemplary embodiments of the present invention, the interface 13 may be configured to receive, from the network entity 20, an instruction to switch the current mode between the adjacent and non-adjacent carrier modes, and the processor 11 may be further configured to reconfigure, based on the received instruction, the configurable contiguous receiving bandwidth such that a current mode is switched between the adjacent carrier mode and the non-adjacent carrier mode.

According to exemplary embodiments of the present invention, the processor 11, the memory 12 and the interface 13 can be implemented as individual modules, chipsets or the like, or one or more of them can be implemented as a common module, chipset or the like.

According to exemplary embodiments of the present invention, the device 20 may be a network entity being configured for at least one of contiguous-band multicarrier HSPDA operation and intraband CA operation in accordance with LTE specifications, and/or the device 20 may be a network entity comprising at least one of an access node, a NodeB, an evolved NodeB, and a radio network controller.

According to exemplary embodiments of the present invention, the interface 23 is configured for communication with at least a terminal on a cellular band. The processor 13 configured to receive, from the device 10 via said terminal 23, an event for triggering reconfiguration of a configurable contiguous receiving bandwidth of said terminal, to determine, based on the received event, reconfiguration of the configurable contiguous receiving bandwidth of the device 10 such that a current mode of the device 10 is switched between the adjacent carrier mode and the non-adjacent carrier mode, and to send, to the device 10 via said interface 23, an instruction to switch the current mode of said terminal between the adjacent and non-adjacent carrier modes based on the determined bandwidth reconfiguration.

According to exemplary embodiments of the present invention, the processor 21 may be configured to operate as follows depending on the received event (or the current operating mode of the terminal). In case of the received event being the imbalance event, the processor 21 may be configured to determine reconfiguration of said configurable contiguous receiving bandwidth of said terminal such that the current mode of said terminal is switched from the non-adjacent carrier mode to the adjacent carrier mode. In case of the received event being the non-imbalance event, the processor 21 may be configured to, for determining, determine reconfiguration of said configurable contiguous receiving bandwidth of said terminal such that the current mode of said terminal is switched from the adjacent carrier mode to the non-adjacent carrier mode. Further, in case of the received event being the imbalance event, the processor 21 may be configured to receive the event including the aforementioned carrier characteristic measure on each of the one or more carriers and, for determining reconfiguration of the configurable contiguous receiving bandwidth of said terminal based on the received carrier characteristic measure.

According to exemplary embodiments of the present invention, the processor 21, the memory 22 and the interface 23 can be implemented as individual modules, chipsets or the like, or one or more of them can be implemented as a common module, chipset or the like.

According to exemplary embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and/or exemplary embodiments thereof provide multicarrier communication support, such as for non-adjacent multicarrier support for a contiguous-bandwidth receiver. Such embodiments comprise receiving one or more carriers in a configurable contiguous bandwidth, calculating an imbalance metric representing a receiving imbalance over a set of carriers, said imbalance metric representing a difference between a first value based on received signal strength indication on each of one or more carriers and a second value based on received signal strength indication on each of one or more carriers, verifying, based on the calculated imbalance metric, whether a threshold condition relating to a current mode of an adjacent carrier mode and non-adjacent carrier mode is satisfied, and reporting an event for triggering reconfiguration of said configurable contiguous bandwidth to switch the current mode between said adjacent and non-adjacent carrier modes, if the threshold condition is satisfied.

By way of the present invention and/or exemplary embodiments thereof, a receiving bandwidth reconfiguration at a terminal/receiver side may be facilitated in an effective and efficient manner by the above-described mechanisms for triggering, determining and accomplishing reconfiguration between different receiver bandwidths. In this regard, detection of a problem scenario for the receiver, in particular a problem of imbalance in terms of power and/or load on various carriers in a non-adjacent multicarrier scenario, may be facilitated by virtue of one or more specified triggering reconfiguration events (also referred to as measurement events) which is or are issued on the basis of a specified imbalance metric. Thereby, a problem may be confirmed in a reliable manner irrespective of load differences between carriers and independent of other phenomena which might adversely affect conventionally known inter-frequency measurement events or channel quality reports (such as e.g. CQI).

The mechanisms and means for non-adjacent multicarrier support for a contiguous-bandwidth receiver according the present invention and/or exemplary embodiments thereof are applicable in any conceivable environment and/or scenario allowing multicarrier communication, including for example receive (RX) diversity, MIMO, and so on.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

List of acronyms and abbreviations

| | |
|---|---|
| 3GPP | 3$^{rd}$ Generation Partnership Project |
| 4C-HSDPA | 4 Carrier High Speed Downlink Packet Access |
| 8C-HSDPA | 8 Carrier High Speed Downlink Packet Access |
| CA | carrier aggregation |
| CPC | continuous packet connectivity |
| CQI | channel quality indicator |

-continued

List of acronyms and abbreviations

| | |
|---|---|
| DB-DC-HSDPA | Dual Band Dual Cell High Speed Downlink Packet Access |
| DC-HSDPA | Dual Cell High Speed Downlink Packet Access |
| DRX | discontinuous reception |
| DTX | discontinuous transmission |
| Ec/Io | energy per chip/total input power |
| eNB | evolved Node B |
| E-UTRA | Evolved Universal Terrestrial Radio Access |
| HSDPA | High Speed Downlink Packet Access |
| IQ | in-phase/quadrature modulation |
| LTE | long term evolution |
| MIMO | multiple input multiple output |
| QAM | quadrature amplitude modulation |
| RF | radio frequency |
| RNC | radio network controller |
| RRC | radio resource control |
| RSCP | received signal code power |
| RSRP | reference signal received power |
| RSS | receive signal strength indication |
| RSRQ | reference signal received quality |
| SNR | signal-to-noise ratio |
| SIM | subscriber identity module |
| UE | user equipment |
| UTRA | Universal Terrestrial Radio Access |
| WCDMA | Wideband Code Division Multiple Access |

What is claimed is:

1. A method of configuring a carrier mode, the method comprising:

receiving one or more carriers in a configurable contiguous bandwidth, said bandwidth being configurable to include said one or more carriers in an adjacent spectrum range in an adjacent carrier mode or to include two or more carriers in a non-adjacent spectrum range in a non-adjacent carrier mode, calculating an imbalance metric representing a receiving imbalance over a set of carriers that comprise at least said one or more or said two or more carriers, said imbalance metric representing a difference between a first value based on received signal strength indication on each of said one or more or said two or more carriers of said set and a second value based on received signal strength indication on each of said one or more or said two or more carriers of said set, verifying, based on the calculated imbalance metric, whether a threshold condition relating to a current mode of said adjacent and non-adjacent carrier modes is satisfied, and reporting an event for triggering reconfiguration of said configurable contiguous bandwidth to switch the current mode between said adjacent and non-adjacent carrier modes, if the threshold condition is satisfied.

2. The method according to claim 1, wherein in case of the current mode being said non-adjacent carrier mode, said verifying comprises comparing the calculated imbalance metric with a first threshold, and said reporting comprises reporting an imbalance event, if the calculated imbalance metric is above said first threshold, and in case of the current mode being said adjacent carrier mode, said verifying comprises comparing the calculated imbalance metric with a second threshold, and said reporting comprises reporting a non-imbalance event, if the calculated imbalance metric is below said second threshold, wherein said first threshold is above said second threshold.

3. The method according to claim 1, wherein
in case of the current mode being said non-adjacent carrier mode, said reporting comprises reporting said event including a carrier characteristic measure on each of said one or more carriers of said set,
wherein said carrier characteristic measure includes at least one of a received signal strength indication, received signal code power, a ratio of energy per chip and total input power, reference signal received power, and reference signal received quality.

4. The method according to claim 1, wherein
the first value is a maximum value of received signal strength indication on each of the carriers of said set, and the second value is a minimum value of received signal strength indication on each of the carriers of said set, or
the first value is a maximum value of received signal strength indication on each of non-dedicated carriers out of said set, and the second value is a minimum value of received signal strength indication on each of dedicated carriers out of said set, or
the first value is the maximum value of received signal strength indication on each of the non-dedicated carriers out of said set, and the second value is an average value of received signal strength indication on each of of the dedicated carriers out of said set, or
the first value is an average value of received signal strength indication on each of the non-dedicated carriers out of said set, and the second value is the minimum value of received signal strength indication on each of the dedicated carriers out of said set,
wherein, in case of the current mode being said non-adjacent carrier mode, said set comprises received carriers only, and, in case of the current mode being said adjacent carrier mode, said set comprises received carriers and candidate carriers to be received after a candidate reconfiguration.

5. The method according to claim 1, further comprising:
receiving, from a network entity, an instruction to switch the current mode between said adjacent and non-adjacent carrier modes, and
reconfiguring, based on the received instruction, said configurable contiguous receiving bandwidth such that the current mode is switched between said adjacent carrier mode and said non-adjacent carrier mode.

6. The method according to claim 1, wherein
the method is executed at or by a terminal, and
said terminal comprises a contiguous-bandwidth receiver configured to operate in one of said adjacent carrier mode and said non-adjacent carrier mode, or
said terminal is configured for at least one of single-band multicarrier high speed downlink packet access operation and intraband carrier aggregation operation.

7. A method comprising:
receiving, from a terminal, an event for triggering reconfiguration of a configurable contiguous receiving bandwidth of said terminal,
determining, based on the received event, reconfiguration of said configurable contiguous receiving bandwidth of said terminal such that a current mode of said terminal is switched between an adjacent carrier mode in which said bandwidth includes one or more carriers in an adjacent spectrum range and a non-adjacent carrier mode in which said bandwidth includes two or more carriers in a non-adjacent spectrum range, and
sending, to said terminal, an instruction to switch the current mode of said terminal between said adjacent and non-adjacent carrier modes based on the determined bandwidth reconfiguration,
wherein the event is received in response to an imbalance metric satisfying a threshold condition relating to the current mode of said terminal, said imbalance metric representing a receiving imbalance over a set of carriers that comprise at least said one or more or said two or more carriers, and said imbalance metric representing a difference between a first value based on received signal strength indication on each of said one or more or said two or more carriers of said set and a second value based on received signal strength indication on each of said one or more or said two or more carriers of said set.

8. The method according to claim 7, wherein
in case of the received event being an imbalance event, said determination comprises determining reconfiguration of said configurable contiguous receiving bandwidth of said terminal such that the current mode of said terminal is switched from said non-adjacent carrier mode to said adjacent carrier mode, and
in case of the received event being a non-imbalance event, said determination comprises determining reconfiguration of said configurable contiguous receiving bandwidth of said terminal such that the current mode of said terminal is switched from said adjacent carrier mode to said non-adjacent carrier mode.

9. The method according to claim 7, wherein
in case of the received event being an imbalance event, said receiving comprises receiving said event including a carrier characteristic measure on each of said one or more carriers, and said determining comprises determining reconfiguration of said configurable contiguous receiving bandwidth of said terminal based on the received carrier characteristic measure,
wherein said carrier characteristic measure includes at least one of a received signal strength indication, received signal code power, a ratio of energy per chip and total input power, reference signal received power, and reference signal received quality.

10. The method according to claim 7, wherein
the method is executed at or by a network entity associated with said terminal, and wherein
said network entity is configured for at least one of single-band multicarrier high speed downlink packet access operation and intraband carrier aggregation operation in accordance with long-term evolution specifications, or
said network entity comprises at least one of an access node, a NodeB, an evolved NodeB, and a radio network controller.

11. An apparatus for configuring a carrier mode, the apparatus comprising:
an interface arranged to communicate with at least a network entity on a cellular band, wherein said interface is arranged to receive one or more carriers in a configurable contiguous bandwidth, said bandwidth being arranged to include said one or more carriers in an adjacent spectrum range in an adjacent carrier mode or to include two or more carriers in a non-adjacent spectrum range in a non-adjacent carrier mode, and
a processing system arranged to
calculate an imbalance metric representing a receiving imbalance over a set of carriers that comprise at least said one or more or said two or more carriers, said imbalance metric representing a difference between a first value based on received signal strength indication on each of said one or more or said two or more carriers of said set and a second value based on received signal strength indication on each of said one or more or said two or more carriers of said set, verify, based on the calculated imbalance metric, whether a threshold condition relating to a current mode of said adjacent and non-adjacent carrier modes is satisfied, and report, via said interface, an event for triggering reconfiguration of said configurable contiguous bandwidth to switch the current mode between said adjacent and non-adjacent carrier modes, if the threshold condition is satisfied.

12. The apparatus according to claim 11, wherein in case of the current mode being said non-adjacent carrier mode, the processing system is arranged to, for said verifying, compare the calculated imbalance metric with a first threshold and, for reporting, report an imbalance event, if the calculated imbalance metric is above said first threshold, and in case of the current mode being said adjacent carrier mode, the processing system is arranged to, for said verifying, compare the calculated imbalance metric with a second threshold and, for said reporting, report a non-imbalance event, if the calculated imbalance metric is below said second threshold, wherein said first threshold is above said second threshold.

13. The apparatus according to claim 11, wherein in case of the current mode being said non-adjacent carrier mode, the processing system is arranged to, for said reporting, report said event including a carrier characteristic measure on each of said one or more carriers of said set, wherein said carrier characteristic measure includes at least one of a received signal strength indication, received signal code power, a ratio of energy per chip and total input power, reference signal received power, and reference signal received quality.

14. The apparatus according to claim 11, wherein in said calculating the imbalance metric the first value is a maximum value of received signal strength indication on each of the carriers of said set, and the second value is a minimum value of received signal strength indication on each of the carriers of said set, or the first value is a maximum value of received signal strength indication on each of non-dedicated carriers out of said set, and the second value is a minimum value of received signal strength indication on each of dedicated carriers out of said set, or the first value is the maximum value of received signal strength indication on each of the non-dedicated carriers out of said set, and the second value is an average value of received signal strength indication on each of the dedicated carriers out of said set, or the first value is an average value of received signal strength indication on each of the non-dedicated carriers out of said set, and the second value is the minimum value of received signal strength indication on each of the dedicated carriers out of said set, wherein, in case of the current mode being said non-adjacent carrier mode, said set comprises received carriers only, and, in case of the current mode being said adjacent carrier mode, said set comprises received carriers and candidate carriers to be received after a candidate reconfiguration.

15. The apparatus according to claim 11, wherein the interface is further arranged to receive, from a network entity, an instruction to switch the current mode between said adjacent and non-adjacent carrier modes, and the processing system is further arranged to reconfigure, based on the received instruction, said configurable contiguous receiving bandwidth such that a current mode is switched between said adjacent carrier mode and said non-adjacent carrier mode.

16. The apparatus according to claim 11, wherein the apparatus comprises a terminal, and said terminal comprises a contiguous-bandwidth receiver arranged to operate in one of said adjacent carrier mode and said non-adjacent carrier mode, or said terminal is configured for at least one of single-band multicarrier high speed downlink packet access operation and intraband carrier aggregation operation.

17. An apparatus comprising:

an interface configured for communication with at least a terminal on a cellular band, and a processing system arranged to receive, from said terminal, an event for triggering reconfiguration of a configurable contiguous receiving bandwidth of said terminal, determine, based on the received event, reconfiguration of said configurable contiguous receiving bandwidth of said terminal such that a current mode of said terminal is switched between an adjacent carrier mode in which said bandwidth includes one or more carriers in an adjacent spectrum range and a non-adjacent carrier mode in which said bandwidth includes two or more carriers in a non-adjacent spectrum range, and send, to said terminal via said interface, an instruction to switch the current mode of said terminal between said adjacent and non-adjacent carrier modes based on the determined bandwidth reconfiguration, wherein the event is received in response to an imbalance metric satisfying a threshold condition relating to the current mode of said terminal, said imbalance metric representing a receiving imbalance over a set of carriers that comprise at least said one or more or said two or more carriers, and said imbalance metric representing a difference between a first value based on received signal strength indication on each of said one or more or said two or more carriers of said set and a second value based on received signal strength indication on each of said one or more or said two or more carriers of said set.

18. The apparatus according to claim 17, wherein in case of the received event being an imbalance event, the processing system is arranged to, for said determining, determine reconfiguration of said configurable contiguous receiving bandwidth of said terminal such that the current mode of said terminal is switched from said non-adjacent carrier mode to said adjacent carrier mode, and in case of the received event being a non-imbalance event, the processing system is arranged to, for said determining, determine reconfiguration of said configurable contiguous receiving bandwidth of said terminal such that the current mode of said terminal is switched from said adjacent carrier mode to said non-adjacent carrier mode.

19. The apparatus according to claim 17, wherein in case of the received event being an imbalance event, the processing system is arranged to receive said event including a carrier characteristic measure on each of said one or more carriers and, for determining, determine reconfiguration of said configurable contiguous receiving bandwidth of said terminal based on the received carrier characteristic measure, wherein said carrier characteristic measure includes at least one of a received signal strength indication, received signal code power, a ratio of energy per chip and total input power, reference signal received power, and reference signal received quality.

20. The apparatus according to claim 17, wherein
the apparatus comprises a network entity associated with said terminal, and
said network entity is configured for at least one of single-band multicarrier high speed downlink packet access operation and intraband carrier aggregation operation in accordance with long-term evolution specifications, or
said network entity comprises at least one of an access node, a NodeB, an evolved NodeB, and a radio network controller.

* * * * *